(12) United States Patent
van't Westeinde

(10) Patent No.: US 10,546,254 B2
(45) Date of Patent: Jan. 28, 2020

(54) SYSTEM AND METHOD FOR EFFICIENT STORAGE OF POINT-TO-POINT TRAFFIC PATTERNS

(71) Applicant: ORACLE INTERNATIONAL CORPORATION, Redwood Shores, CA (US)

(72) Inventor: Charles P. van't Westeinde, Victoria (AU)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 1039 days.

(21) Appl. No.: 15/006,162

(22) Filed: Jan. 26, 2016

(65) Prior Publication Data
US 2017/0213180 A1 Jul. 27, 2017

(51) Int. Cl.
*G06Q 10/06* (2012.01)
*G01C 21/26* (2006.01)

(52) U.S. Cl.
CPC ..... *G06Q 10/063114* (2013.01); *G01C 21/26* (2013.01)

(58) Field of Classification Search
CPC .......... G06Q 10/00; G06Q 10/063114; G06Q 50/28; G06Q 50/30; G01C 21/26
USPC ....................................................... 701/400
See application file for complete search history.

(56) References Cited

U.S. PATENT DOCUMENTS

| | | | | |
|---|---|---|---|---|
| 8,738,289 B2* | 5/2014 | Ghoting | ................. | G08G 1/202 |
| | | | | 701/400 |
| 2005/0043037 A1* | 2/2005 | Ioppe | .................... | H04W 4/029 |
| | | | | 455/456.1 |
| 2008/0186234 A1* | 8/2008 | Alles | ....................... | G01S 5/021 |
| | | | | 342/451 |

(Continued)

OTHER PUBLICATIONS

Patent Cooperation Treaty (PCT) International Search Report and Written Opinion in co-pending PCT International Appl. No. PCT/US2017/014703 (International Filing Date of Jan. 24, 2017) dated May 11, 2017 (15 pgs.).

(Continued)

*Primary Examiner* — Thomas G Black
*Assistant Examiner* — Luat T Huynh
(74) *Attorney, Agent, or Firm* — Kraguljac Law Group, LLC

(57) ABSTRACT

Computerized embodiments are disclosed for efficiently storing site-to-site transit information in a reduced amount of computer memory. In one embodiment, a transit data structure and a compensation data structure are generated and stored in memory of a computer. The transit data structure has dimensions of first job site identifiers by second job site identifiers that allow transit data cells of the transit data structure to be addressed. Each transit data cell stores a pattern index value representing a traffic pattern and a base travel time value representing a minimum travel time between two job sites. The compensation data structure has dimensions of pattern index values by level index values that allow compensation data cells of the compensation data structure to be addressed. The level index values are derived from travel conditions and vehicle conditions. Each compensation data cell stores a single byte of data for adjusting base travel time values.

20 Claims, 4 Drawing Sheets

(56) References Cited

U.S. PATENT DOCUMENTS

| | | | |
|---|---|---|---|
| 2012/0109510 A1* | 5/2012 | Ota | B60W 30/188 |
| | | | 701/400 |
| 2014/0310041 A1 | 10/2014 | Crocker et al. | |
| 2015/0161554 A1* | 6/2015 | Sweeney | G06Q 10/063114 |
| | | | 705/7.15 |
| 2015/0161827 A1 | 6/2015 | Getchius | |
| 2016/0202069 A1* | 7/2016 | Wippler, III | G01C 21/26 |
| | | | 701/400 |

OTHER PUBLICATIONS

Anonymous: "Table (information)—Wikipedia", Jan. 20, 2016, retrieved from the internet on Apr. 20, 2017 at: https://en.wikipedia.org/w/index.php?title=Table_(information)&oldid=700788987 (6 pgs).

Anonymous: "Attribute-value system—Wikipedia", Aug. 20, 2015, retrieved from the internet on Apr. 20, 2017 at: https://en.wikipedia.org/w/index.php?title+Attribute-value_system&oldid=677042788(4 pgs).

Anonymous: "First normal form—Wikipedia", Jan. 20, 2016, retrieved from the Internet on Apr. 20, 2017 at: https://en.wikipedia.org/w/index.php?title=First_normal_form&oldid=700743087.

\* cited by examiner

SYSTEM AND METHOD FOR EFFICIENT STORAGE OF POINT-TO-POINT TRAFFIC PATTERNS

BACKGROUND

In certain industries (e.g., construction, service maintenance, package delivery), many vehicles are continuously dispatched from one location to another. A central dispatcher uses a scheduling algorithm to schedule the transit of each vehicle from one location to another in an attempt to maximize vehicle usage and minimize travel times of the vehicles. Travel times and/or travel distances between locations are estimated and stored in the cells of an in-memory travel matrix as part of a database system. The travel matrix can become very large as the number of locations, travel conditions, and vehicle conditions grows. As a result, computer memory in the database system can become very large (e.g., too large to implement or manage). Furthermore, time delays associated with accessing the travel matrix in the database system can become unacceptable, adversely affecting system dispatching performance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed that provide for storing data, related to vehicles traveling between job sites, in a limited or reduced amount of memory which can be efficiently accessed in a timely manner. The reduced amount of memory is part of a computer system that runs a scheduler application for scheduling the transit of vehicles between job sites. The reduced amount of memory is not part of a database system. Therefore, the reduced amount can be accessed by the scheduling application in a timely manner, without suffering the delays associated with accessing a database system.

In one embodiment, a reduced memory usage logic is provided that generates a transit data structure and a compensation data structure that, together, are configured to limit memory usage within a computing device. The transit data structure and the compensation data structure are configured such that up-to-date estimates of travel time between job sites for vehicles can be generated, stored, and accessed efficiently, using a minimal amount of computer memory. Alternatively, storing travel times for a large number of transit scenarios in a traditional manner would use up a very large amount of memory very quickly and become unmanageable.

The following terms are used herein with respect to various embodiments.

The term "dimension", as used herein, refers to an aspect of a data structure. For example, a data structure may be in the form of a matrix having two dimensions, a horizontal dimension representing a first parameter and a vertical dimension representing a second parameter.

The term "data cell", as used herein, refers to a field in a data structure that stores data. Data may be retrieved from a data cell by addressing the data structure dimensions. For example, a two-dimensional data structure may be addressed by providing an associated parameter of the first dimension and an associated parameter of the second dimension.

The term "travel time", as used herein, refers to an amount time to travel from one location to another location (e.g., from one job site to another job site).

Figure 1:
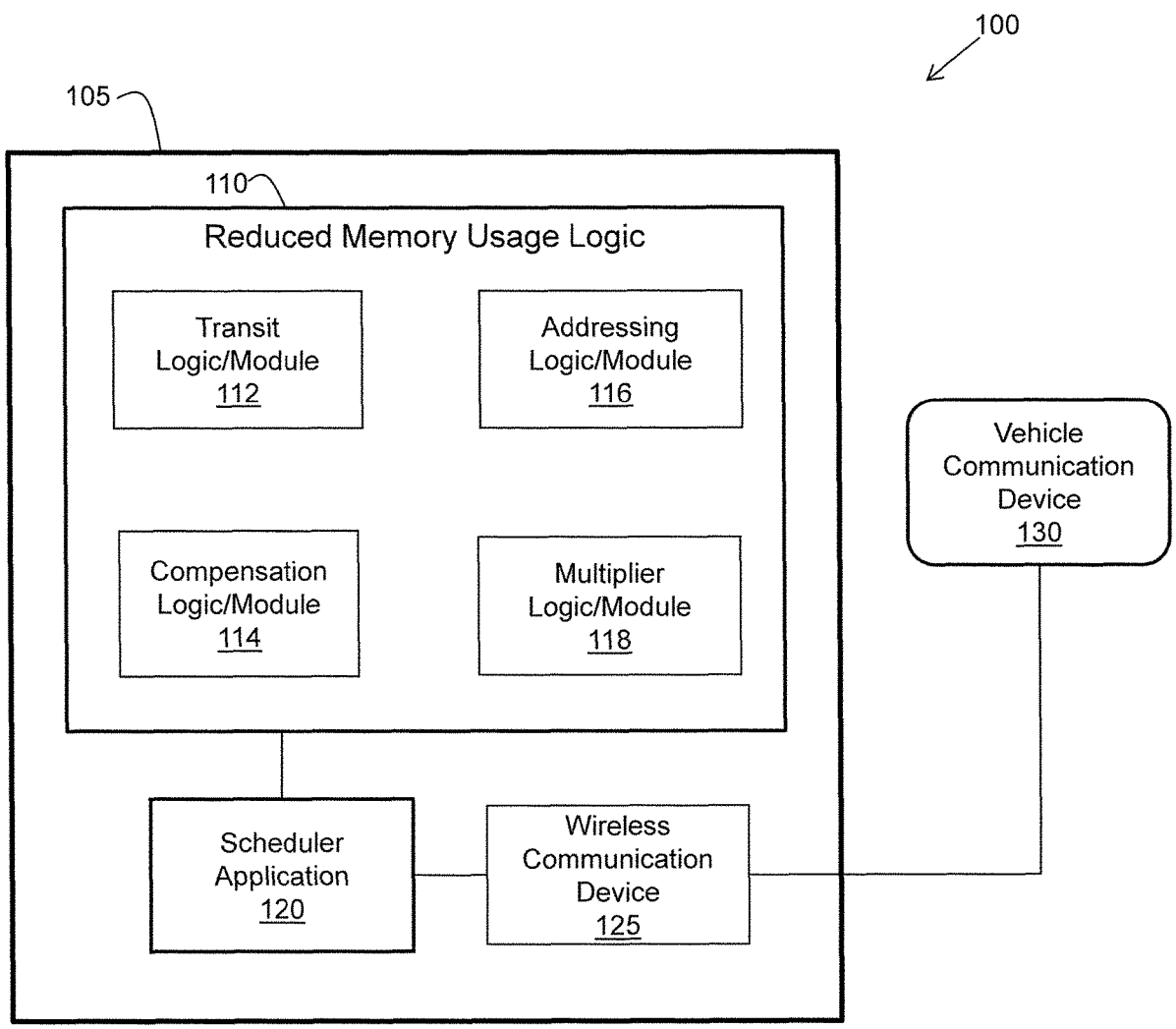
FIG. 1 illustrates one embodiment of a computer system having a computing device configured with reduced memory usage logic for generating and storing data, related to vehicles traveling between job sites, in a limited amount of memory which can be efficiently accessed in a timely manner.

FIG. 1 illustrates one embodiment of a computer system 100 having a computing device 105 configured with reduced memory usage logic 110 for generating and storing data, related to vehicles traveling between job sites, in a limited amount of memory which can be efficiently accessed in a timely manner. In one embodiment, reduced memory usage logic 110 is configured to work with a computer application (e.g., a scheduler application), without affecting the integrity of operation of the computer application. In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

Reduced memory usage logic 110 is configured to computerize the process of storing transit information in a reduced memory configuration which is not part of a database system and which can be accessed by a scheduler application. In one embodiment, two data structures are formed in memory and are configured to store transit information in such a manner that uses significantly less memory than traditional means of storing similar information.

With reference to FIG. 1, in one embodiment, reduced memory usage logic 110 is implemented on the computing device 105 and includes logics or modules for implementing various functional aspects of reduced memory usage logic 110. In one embodiment, reduced memory usage logic 110 includes transit logic/module 112, compensation logic/module 114, addressing logic/module 116, and multiplier logic/module 118.

Other embodiments may provide different logics or combinations of logics that provide the same or similar functionality as reduced memory usage logic 110 of FIG. 1. In one embodiment, reduced memory usage logic 110 is an executable application including algorithms and/or program modules configured to perform the functions of the logics. The application is stored in a non-transitory computer storage medium. That is, in one embodiment, the various logics of reduce memory usage logic 110 are implemented as modules of instructions stored on a computer-readable medium.

The computer system 100 also includes a scheduler application 120 configured to operate on the computing device 105. The scheduler application 120 is a computer application that is configured to schedule the transit of vehicles between job sites. In one embodiment, the scheduler application 120 is a pre-existing or legacy computer application, and reduced memory usage logic 110 is configured to be compatible with the pre-existing computer application. In another embodiment, the scheduler application 120 may be a new computer application designed to work with reduced memory usage logic 110.

The computer system 100 also includes multiple vehicle communication devices, one of which (vehicle communication device 130) is shown in FIG. 1. As stated previously herein, the scheduler application 120 is a computer application that is configured to schedule the transit of vehicles between job sites. In accordance with one embodiment, each vehicle in the field includes a vehicle communication device 130. The scheduler application 120, as implemented on the computing device 105, is configured to communicate with each vehicle communication device 130 to tell the crew of each vehicle which job site to travel to next and along which route. The scheduler application 120 takes into account the condition of all vehicles in the field along with current travel conditions in an attempt to dispatch the vehicles in a manner that minimizes travel times between job sites.

In one embodiment, scheduler application 120 communicates with a vehicle communication device 130 in a wireless manner (e.g., via radio communication). For example, in one embodiment, the vehicle communication device may be a cellular telephone device used by one of the crew members of the vehicle. For example, the cellular telephone device may be a "smart phone" device running a navigation application that is configured to use input information received from the scheduler application 120 to navigate from a current job site to a next job site.

In one embodiment, the computing device 105 is a centralized server-side application that provides at least the functions disclosed herein, and that receives information over a computer network from other services. For example, the computing device 105 can receive information related to travel conditions, routes between job sites, and vehicle conditions via network communications from other services. Such information can be processed by the scheduler application 120 and stored by reduced memory usage logic 110.

Figure 2:
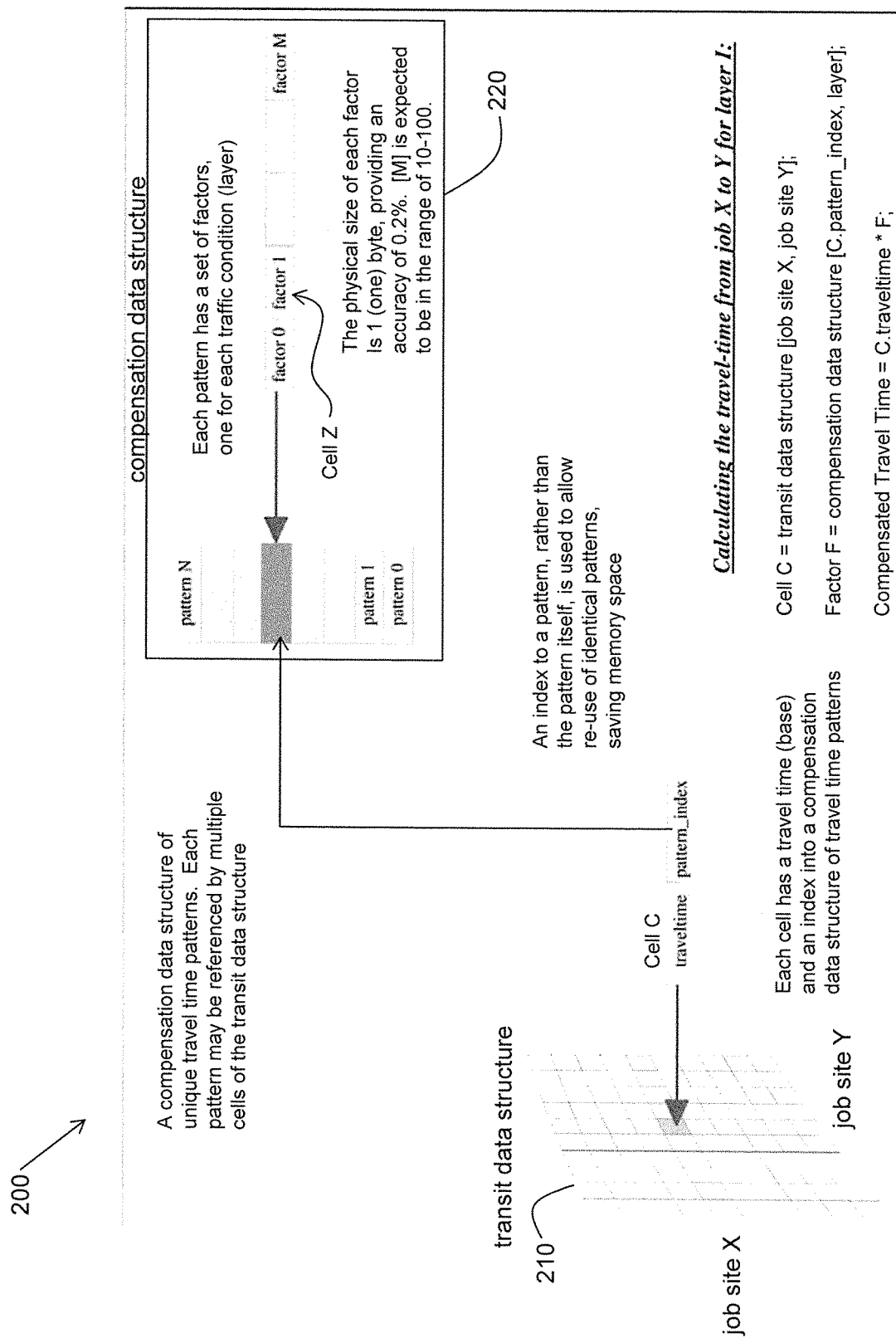
FIG. 2 illustrates one embodiment of a data structure configuration for storing data, related to vehicles traveling between job sites, in a limited amount of memory which can be efficiently accessed in a timely manner using the computer system of FIG. 1.

FIG. 2 illustrates one embodiment of a data structure configuration 200 for generating and storing data, related to vehicles traveling between job sites, in a limited amount of memory which can be efficiently accessed in a timely manner using the computer system 100 of FIG. 1. The data structure configuration 200 includes a transit data structure 210 and a compensation data structure 220.

Referring again to FIG. 1, in one embodiment, transit logic 112 is configured to generate the transit data structure 210 stored in a first memory of the computing device 105. The transit data structure 210 is a two-dimensional array or matrix having dimensions of first job site identifiers by second job site identifiers. That is, a first dimension (e.g., an x-axis) of the transit data structure 210 corresponds to identifiers that identify a first set of job sites and a second dimension (e.g., a y-axis) of the transit data structure 210 corresponds to identifiers that identify a second set of job sites. As a result, transit information may be stored in the transit data structure 210 and corresponds to information related to going from any job site to any other job site in the sets of job sites.

The transit data structure 210 has multiple transit data cells that store the transit information related to going from one job site to another job site (e.g., from job site X to job site Y as indicated in FIG. 2). A unique transit data cell (e.g., cell C as indicated in FIG. 2) can be addressed (i.e., accessed) to retrieve the transit information stored in memory for that transit data cell. Therefore, pairs of job site identifiers allow for the addressing of the transit data cells of the transit data structure 210. In accordance with one embodiment, each transit data cell stores transit information as a pattern index value and a base travel time value. The pattern index value represents a traffic pattern related to going from one job site to another job site. The base travel time value represents a minimum time to travel from the one job site to the other job site (e.g., when conditions are ideal).

In one embodiment, compensation logic 114 is configured to generate the compensation data structure 220 stored in a second memory of the computing device 105. The compensation data structure 220 is a two-dimensional array or matrix having dimensions of pattern index values by level index values. That is, a first dimension (e.g., an x-axis) of the compensation data structure 220 corresponds to pattern index values that identify traffic patterns and a second dimension (e.g., a y-axis) of the compensation data structure 220 corresponds to level index values that identify traffic condition layers. In one embodiment, level index values are derived from possible travel conditions between job sites and possible vehicle conditions of vehicles assigned to travel between the job sites. As a result, scaling information may be stored in the compensation data structure 220 that corresponds to information related to adjusting travel times based on current conditions.

The compensation data structure 220 has multiple compensation data cells that store the compensation information related to adjusting the base travel time from one job site to another job site (e.g., from job site X to job site Y as indicated in FIG. 2). A unique compensation data cell (e.g., cell Z as indicated in FIG. 2) can be addressed (i.e., accessed) to retrieve the compensation information stored in memory for that compensation data cell. Therefore, pattern index values from the transit data structure and level index values from an outside source (e.g., from the scheduler application or another service) allow for the addressing of the compensation data cells of the compensation data structure 220. In accordance with one embodiment, each compensation data cell stores a single byte (8-bits) of data representing a scaling factor value for adjusting base travel time values. In one embodiment, a scaling factor value is used to increase a base travel time value accessed from the transit data structure 210 to more accurately reflect current conditions which may deviate from the ideal conditions.

In one embodiment, addressing logic 116 is configured to receive a first job site identifier that identifies a first job site, a second job site identifier that identifies a second job site, and a level index value. The level index value is derived from current travel conditions associated with traveling from the first job site to the second job site and current vehicle conditions associated with a vehicle assigned to travel from the first job site to the second job site. The first job site identifier, the second job site identifier, and the level index value are provided by the scheduler application 120, in accordance with one embodiment. Furthermore, the level index value may be derived by the scheduler application 120 based on current travel conditions and current vehicle conditions obtained by the scheduler application from an external computerized service via network communications, for example.

Furthermore, in one embodiment, addressing logic 116 is configured to address the transit data structure 210 based on the first job site identifier and the second job site identifier to retrieve a first base travel time value and a first pattern index value (e.g., to retrieve the base travel time value and the pattern index value from cell C by addressing job site X and job site Y of the transit data structure 210). Addressing logic 116 is also configured to address the compensation data structure 220 based on the first pattern index value (retrieved from the transit data structure) and the level index value (received from the scheduler application 120) to retrieve a first scaling factor value.

In one embodiment, the scaling factor value is a numerical value that is greater than or equal to one (1) such as, for example, 1.0, 1.1, 1.2, 1.3, 1.4, 1.5, 1.6, 1.7, 1.8, or 1.9. Furthermore, in accordance with one embodiment, multiplier logic 118 is configured to generate a compensated travel time value representing an updated travel time for the vehicle to travel between the first job site and the second job site. Multiplier logic 118 is configured to generate the compensated travel time value by multiplying the first base travel time value by the first scaling factor value. As an example, if the first base travel time value is 30 minutes (representing the minimum travel time for the vehicle to get from job site X to job site Y under ideal conditions), and the first scaling factor value is 1.3, then the compensated travel time value is computed to be 30 minutes×1.3=39 minutes. In another embodiment, scaling factor values can be less than or equal to one (1) and multiplier logic 118 can multiply a base travel time by the reciprocal of the scaling factor value.

As a result, a separate travel time value for each possible set of travel conditions and each possible set of vehicle conditions does not have to be generated and stored in memory for each possible pair of job sites. Storing travel times as such could use a tremendously large amount of memory as the number of job sites, travel conditions, and vehicle conditions grow. Instead, a transit data structure and a compensation data structure, configured and addressed as described herein, allow for a reduced amount of memory to be used. An index to a travel pattern, rather than the pattern itself, is used to allow re-use of identical patterns to save memory space. Furthermore, the physical size of each scaling factor is limited to one (1) byte (8-bits), further saving memory space.

In one embodiment, the scheduler application 120 is configured to receive the compensated travel time value from multiplier logic 118 and generate an electronic message. The electronic message indicates that a vehicle is assigned to travel from the first job site to the second job site during the updated travel time as represented by the compensated travel time value. Furthermore, the scheduler application 120 is configured to wirelessly transmit the electronic message, in cooperation with a communication device 125 of the computing device 105, to a communication device associated with the vehicle to inform a crew of the vehicle (e.g., a work maintenance crew) where to travel to next.

In this manner, reduced memory usage logic 110 allows for the efficient storage of transit data that reflects all of the possible conditions associated with traveling between known job sites using known vehicles. Furthermore, reduced memory usage logic 110 facilitates quick and real time access of travel times, which are compensated for based on current conditions, by the scheduler application 120. This results in the scheduling application 120 being able to schedule (assign) vehicles to travel between job sites in an optimal manner, reducing overall travel times.

Figure 3:
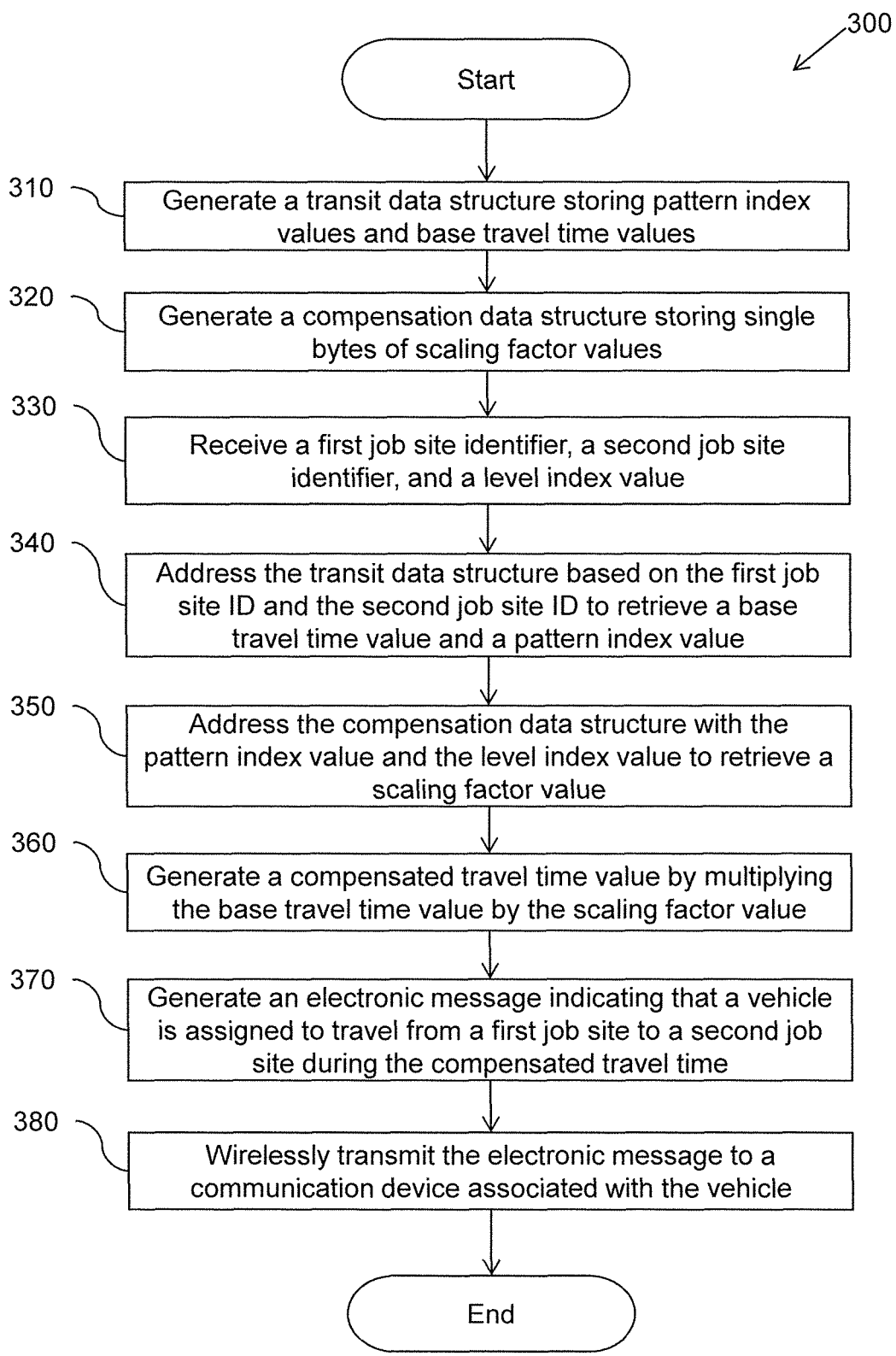
FIG. 3 illustrates one embodiment of a method which can be performed by the computer system of FIG. 1 to generate and store data, related to vehicles traveling between job sites, in a limited amount of memory which can be efficiently accessed in a timely manner.

FIG. 3 illustrates one embodiment of a method 300 which can be performed by the computer system 100 of FIG. 1 to generate and store data, related to vehicles traveling between job sites, in a limited amount of memory which can be efficiently accessed in a timely manner. Method 300 describes operations of reduced memory usage logic 110 and is implemented to be performed by reduced memory usage logic 110 of FIG. 1, or by a computing device configured with an algorithm of the method 300. For example, in one embodiment, method 300 is implemented by a computing device configured to execute a computer application. The computer application is configured to process data in electronic form and includes stored executable instructions that perform the functions of method 300.

Method 300 will be described from the perspective that reduced memory usage logic 110 is provided which allows transit data to be generated, stored, and accessed in an efficient manner using less memory (e.g., at least two orders of magnitude less memory) than would be used to directly store an equivalent representative number of compensated travel time values. Method 300 will also be described from the perspective that reduced memory usage logic 110 can be used with a scheduling computer application 120 without affecting the operational integrity of the scheduling computer application 120.

Upon initiating method 300, a transit data structure 210 is generated at block 310 and a compensation data structure 220 is generated at block 320 that, together, are configured to limit memory usage within a computing device 105. In one embodiment, the transit data structure 210 is generated by transit logic 112 and the compensation data structure 220 is generated by compensation logic 114. Neither the transit data structure 210 nor the compensation data structure 220 are stored as part of a database system, as this could increase data access times to unacceptable levels.

The transit data structure is stored in a first memory of the computing device 105 and has dimensions of first multiple job site identifiers by second multiple job site identifiers to allow addressing of multiple transit data cells of the transit data structure. Each of the multiple transit data cells store a pattern index value representing a traffic pattern and a base travel time value representing a minimum travel time between two job sites.

The compensation data structure is stored in a second memory of the computing device 105 and has dimensions of multiple pattern index values by multiple level index values to allow addressing of multiple compensation data cells of the compensation data structure. Each of the multiple compensation data cells store a single byte (e.g., 8-bits) of data representing a scaling factor value for adjusting base travel time values. The single byte of data provides an accuracy of 0.2 percent with respect to representing the first scaling factor value, in accordance with one embodiment.

At block 330, a first job site identifier that identifies a first job site, a second job site identifier that identifies a second job site, and a level index value are received. The level index value is derived from current travel conditions between the first job site and the second job site and current vehicle conditions of a vehicle at least tentatively assigned to travel from the first job site to the second job site. In accordance with one embodiment, the first job site identifier, the second job site identifier, and the level index value are received by reduced memory usage logic 110 from scheduler application 120.

The current travel conditions take into account at least one of a time-of-day, a day-of-the-week, a date, or a holiday. The current vehicle conditions take into account at least one of a type-of-vehicle and a vehicle load. The type-of-vehicle may correspond to, for example, a maintenance van, a dump truck, a cement truck, or any of a number of different types of vehicles. The vehicle load corresponds to how much material or product (e.g., dirt, concrete, gravel, etc.) a vehicle is to carry from the first job site to the second job site. The vehicle load may correspond to, for example, a full load, a three-quarter load, a half load, a one-quarter load, or no load (i.e., the vehicle is empty).

At block 340, the transit data structure 210 is addressed based on the first job site identifier and the second job site identifier to retrieve a first base travel time value and a first pattern index value. Addressing of the transit data structure 210 is accomplished by addressing logic 116, in one embodiment. The first base travel time value represents a minimum time for a vehicle to travel from the first job site to the second job site. The first pattern index value is associated with a first traffic pattern.

In accordance with one embodiment, the first base travel time value and the first pattern index value are derived at least from roadmap data associated with traveling from the first job site to the second job site. The roadmap data may be obtained, for example, by the scheduler application 120 from an external mapping database via computerized network communications, in accordance with one embodiment.

At block 350, the compensation data structure 220 is addressed based on the first pattern index value from the transit data structure 210 and the level index value to retrieve a first scaling factor value. Again, first pattern index value is associated with a first traffic pattern and the level index value is derived from current travel conditions between the first job site and the second job site and current vehicle conditions of a vehicle at least tentatively assigned to travel from the first job site to the second job site. Addressing of the compensation data structure 220 is accomplished by addressing logic 116, in one embodiment. The first scaling factor value is a number greater than or equal to one (1), in accordance with one embodiment (e.g., 1.00, 1.05, 1.10, 1.15, 1.20, etc.).

At block 360, the first scaling factor value is used to generate a compensated travel time value representing an updated travel time for the vehicle to travel from the first job site to the second job site. In one embodiment, the compensated travel time value is generated by multiplier logic 118, by multiplying the first base travel time value by the first scaling factor value. The compensated travel time value compensates for current travel and vehicle conditions, as deviated from ideal conditions, by extending the base travel time value.

At block 370, the scheduling algorithm 120 generates an electronic message indicating that a vehicle is assigned to travel from the first job site to the second job site during the updated travel time. At block 380, the scheduling algorithm 120, in cooperation with a communication device 125 of the computing device 105, wirelessly transmits the electronic message to a communication device 130 associated with the vehicle.

In this manner, method 300 may be implemented on a computing device 105 hosting a scheduling computer application 120. Method 300 generates data structures that use significantly less memory to store travel times than conventional methods. The scheduling application 120 can efficiently access the data structures via reduced memory usage logic 110 to obtain adjusted travel times that reflect current conditions.

Computing Device Embodiment

Figure 4:
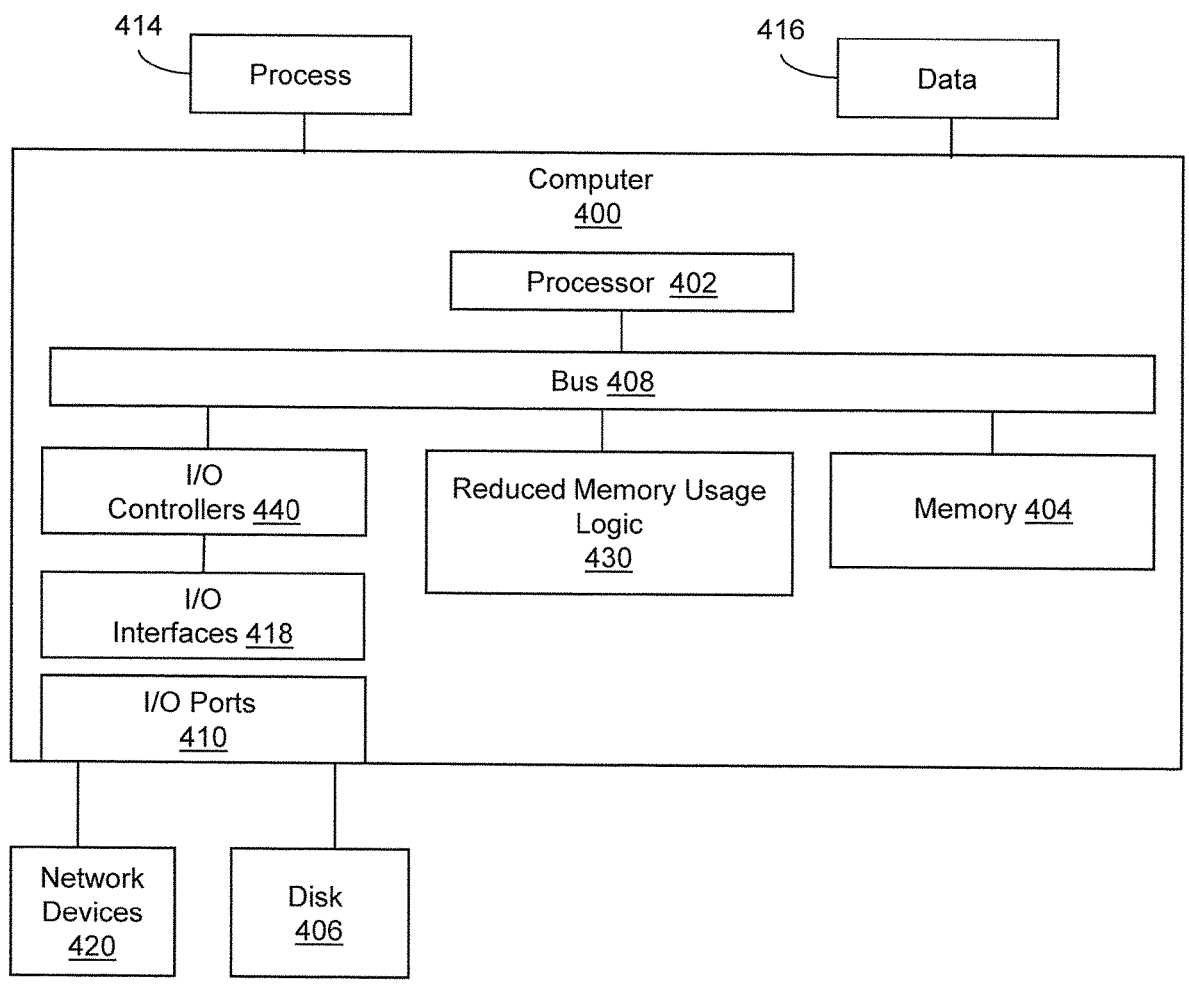
FIG. 4 illustrates an example embodiment of a computing device upon which reduced memory usage logic of a computing system may be implemented.

FIG. 4 illustrates an example computing device that is configured and/or programmed with one or more of the example systems and methods described herein, and/or equivalents. FIG. 4 illustrates one example embodiment of a computing device upon which an embodiment of reduced memory usage logic may be implemented. The example computing device may be a computer 400 that includes a processor 402, a memory 404, and input/output ports 410 operably connected by a bus 408.

In one example, the computer 400 may include reduced memory usage logic 430 (corresponding to reduced memory usage logic 110 from FIG. 1) configured to generate a transit data structure and a compensation data structure that, together, are configured to limit memory usage within the computer. In different examples, logic 430 may be implemented in hardware, a non-transitory computer-readable medium with stored instructions, firmware, and/or combinations thereof. While logic 430 is illustrated as a hardware component attached to the bus 408, it is to be appreciated that in other embodiments, logic 430 could be implemented in the processor 402, a module stored in memory 404, or a module stored in disk 406.

In one embodiment, logic 430 or the computer 400 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to generate a transit data structure and a compensation data structure that, together, are configured to limit memory usage within the computer. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for generating a transit data structure and a compensation data structure that, together, are configured to limit memory usage within the computer.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output devices via the input/output (I/O) controller 440, the input/output (I/O) interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

Systems, methods, and other embodiments have been described that are configured to store data, related to vehicles traveling between job sites, in a limited or reduced amount of memory which can be efficiently accessed in a timely manner. In one embodiment, a transit data structure and a compensation data structure are generated that, together, are configured to limit memory usage within a computing device. The transit data structure is stored in a first memory of the computing device and has dimensions of a number of first job site identifiers by a number of second job site identifiers to allow addressing of multiple transit data cells of the transit data structure. Each transit data cell stores a pattern index value representing a traffic pattern and a base travel time value representing a minimum travel time between two job sites. The compensation data structure is stored in a second memory of the computing device and has dimensions of a number of pattern index values by a number of level index values to allow addressing of multiple compensation data cells of the compensation data structure. Each compensation data cell stores a single byte of data representing a scaling factor value for adjusting base travel time values.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least one processor for executing instructions from a memory, the method comprising:
    limiting memory usage within a computing device to store estimated travel times between job sites by:
        generating a transit data structure including a plurality of transit data cells, wherein the transit data structure is stored in a first memory of the computing device and is configured to have dimensions of a first plurality of job site identifiers by a second plurality of job site identifiers to allow addressing of the plurality of transit data cells of the transit data structure,
    wherein each of the plurality of transit data cell stores a pattern index value representing a traffic pattern and a base travel time value representing a minimum travel time between two job sites; and
        generating a compensation data structure including a plurality of compensation data cells, wherein the compensation data structure is stored in a second memory of the computing device and is configured to have dimensions of a plurality of pattern index values by a plurality of level index values to allow addressing of the plurality of compensation data cells of the compensation data structure, and wherein the plurality of level index values are derived from travel conditions and vehicle conditions of vehicles assigned to travel between job sites, and
    wherein each of the plurality of compensation data cells stores a scaling factor value for adjusting one or more of the base travel time values.

2. The method of claim 1, wherein the transit data structure and the compensation data structure are not stored as part of a database system; and
    wherein the scaling factor value is stored as a single byte of data in a corresponding compensation data cell from the plurality of compensation data cells.

3. The method of claim 1, further comprising:
    receiving a first job site identifier that identifies a first job site, a second job site identifier that identifies a second job site, and a level index value derived from current travel conditions and current vehicle conditions of a vehicle assigned to travel from the first job site to the second job site;

addressing the transit data structure based on the first job site identifier and the second job site identifier to retrieve a first base travel time value and a first pattern index value;

addressing the compensation data structure based on the first pattern index value and the level index value to retrieve a first scaling factor value;

generating a compensated travel time value, representing an updated travel time for the vehicle to travel between the first job site and the second job site, by multiplying the first base travel time value by the first scaling factor value via at least one processor of the computing device;

generating an electronic message indicating that the vehicle is assigned to travel from the first job site to the second job site during the updated travel time; and wirelessly transmitting the electronic message to a communication device associated with the vehicle.

4. The method of claim 3, wherein the current travel conditions take into account at least one of a time-of-day, a day-of-the-week, a date, or a holiday.

5. The method of claim 3, wherein the current vehicle conditions take into account at least one of a type-of-vehicle and a vehicle load.

6. The method of claim 3, wherein the first base travel time value represents a minimum time for the vehicle to travel from the first job site to the second job site.

7. The method of claim 1, wherein the first scaling factor value is greater than or equal to a value of 1.

8. The method of claim 1, wherein the scaling factor is configured as a single byte of data and is an 8-bit byte providing an accuracy of 0.2 percent when representing the scaling factor value.

9. The method of claim 1, wherein the transit data structure and the compensation data structure use at least two orders of magnitude less memory in the computing device as compared to that of directly storing an equivalent representative number of the compensated travel time values.

10. The method of claim 1, wherein a first traffic pattern, associated with a first pattern index value, and the base travel time value are derived at least from roadmap data associated with traveling between the two job sites from a first job site to a second job site.

11. A computing system, comprising:
at least one processor connected to at least one memory;
a non-transitory computer-readable medium operably connected to the at least one processor;
a transit module stored in the non-transitory computer-readable medium including instructions that when executed cause a processor to generate a transit data structure comprising a plurality of transit data cells stored in a first memory of the computing system,
wherein the transit data structure has dimensions of a first plurality of job site identifiers by a second plurality of job site identifiers to allow addressing of the plurality of transit data cells of the transit data structure, and
wherein each of the plurality of transit data cells stores a pattern index value representing a traffic pattern and a base travel time value representing a minimum travel time between two job sites; and
a compensation module, stored in the non-transitory computer-readable medium including instructions that when executed cause the processor to generate a compensation data structure comprising a plurality of compensation data cells stored in a second memory of the computing system that, together with the transit data structure, is configured to limit memory usage within the computer system,
wherein the compensation data structure has dimensions of a plurality of pattern index values by a plurality of level index values to allow addressing of the plurality of compensation data cells of the compensation data structure, and
wherein the plurality of level index values are derived from travel conditions and vehicle conditions of vehicles assigned to travel between job sites, and
wherein each of the plurality of compensation data cells stores a single byte of data representing a scaling factor value for adjusting base travel time values.

12. The computing system of claim 11, further comprising an addressing module stored in the non-transitory computer-readable medium including instructions that when executed cause the processor to:
receive a first job site identifier that identifies a first job site, a second job site identifier that identifies a second job site, and a level index value derived from current travel conditions and current vehicle conditions of a vehicle assigned to travel from the first job site to the second job site;
address the transit data structure based on the first job site identifier and the second job site identifier to retrieve a first base travel time value and a first pattern index value; and
address the compensation data structure based on the first pattern index value and the level index value to retrieve a first scaling factor value.

13. The computing system of claim 12, wherein the addressing module is configured to receive the first job site identifier, the second job site identifier, and the level index value from a scheduler application configured to schedule a plurality of vehicles to travel between job sites.

14. The computing system of claim 12, further comprising a multiplier module stored in the non-transitory computer-readable medium including instructions that when executed cause the processor to generate a compensated travel time value, representing an updated travel time for the vehicle to travel between the first job site and the second job site, by multiplying the first base travel time value by the first scaling factor value.

15. The computing system of claim 14, further comprising a scheduler application configured to:
receive the compensated travel time value from the multiplier module;
generate an electronic message indicating that the vehicle is assigned to travel from the first job site to the second job site during the updated travel time, as represented by the compensated travel time value; and
wirelessly transmit the electronic message to a communication device associated with the vehicle.

16. The computing system of claim 15, wherein the communication device includes a cellular telephone device.

17. The computing system of claim 15, wherein the vehicle is associated with a work maintenance crew.

18. A non-transitory computer-readable medium storing instructions that when executed by one or more processors of a computing device, cause the computing device to at least:

generate a transit data structure comprising a plurality of transit data cells stored in a first memory of the computing device,
- wherein the transit data structure has dimensions of a first plurality of location site identifiers by a second plurality of location site identifiers to allow addressing of the plurality of transit data cells of the transit data structure, and
- wherein each of the plurality of transit data cells stores a pattern index value representing a traffic pattern and a base travel time value representing a minimum travel time between two location sites; and generate a compensation data structure comprising a plurality of compensation data cells stored in a second memory of the computer that, together with the transit data structure, is configured to limit memory usage within the computer,
- wherein the compensation data structure has dimensions of a plurality of pattern index values by a plurality of level index values to allow addressing of the plurality of compensation data cells of the compensation data structure, and
- wherein the plurality of level index values are derived from travel conditions and vehicle conditions of vehicles assigned to travel between location sites, and
- wherein each of the plurality of compensation data cells stores data representing a scaling factor value for adjusting one or more of the base travel time values.

19. The non-transitory computer-readable medium of claim 18, wherein the instructions further comprise instructions that when executed by the one or more processors cause the computing device to:
- receive two location site identifiers comprising a first job identifier that identifies a first job site, a second job site identifier that identifies a second job site, and a level index value derived from current travel conditions and current vehicle conditions of a vehicle assigned to travel from the first job site to the second job site;
- address the transit data structure based on the first job site identifier and the second job site identifier to retrieve a first base travel time value and a first pattern index value; and
- address the compensation data structure based on the first pattern index value and the level index value to retrieve a first scaling factor value.

20. The non-transitory computer-readable medium of claim 19, wherein the instructions further comprise instructions that when executed by the one or more processors cause the computing device to:
- generate a compensated travel time value, representing an updated travel time for the vehicle to travel between the first job site and the second job site, by multiplying the first base travel time value by the first scaling factor value;
- generate an electronic message indicating that the vehicle is assigned to travel from the first job site to the second job site during the updated travel time, as represented by the compensated travel time value; and
- wirelessly transmit the electronic message to a communication device associated with the vehicle.

* * * * *

UNITED STATES PATENT AND TRADEMARK OFFICE
CERTIFICATE OF CORRECTION

PATENT NO. : 10,546,254 B2  
APPLICATION NO. : 15/006162  
DATED : January 28, 2020  
INVENTOR(S) : van't Westeinde It is certified that error appears in the above-identified patent and that said Letters Patent is hereby corrected as shown below:

In the Claims

In Column 13, Line 31, in Claim 7, after "the" delete "first".

Signed and Sealed this
Tenth Day of November, 2020

Andrei Iancu
*Director of the United States Patent and Trademark Office*